June 24, 1958     M. E. CROST     2,840,706
SAMPLING CIRCUIT
Filed Dec. 31, 1954
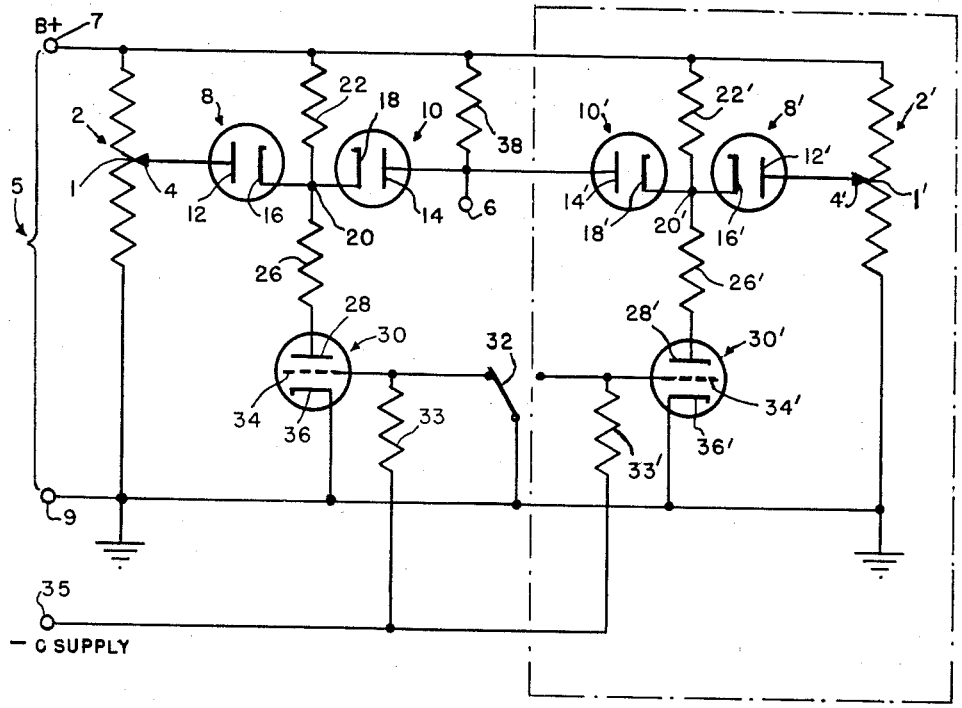
INVENTOR.
MUNSEY E. CROST
BY
Harry M. Saragovitz
ATTORNEY United States Patent Office 2,840,706
Patented June 24, 1958

2,840,706

SAMPLING CIRCUIT

Munsey E. Crost, Asbury Park, N. J., assignor to the United States of America as represented by the Secretary of the Army Application December 31, 1954, Serial No. 479,256

3 Claims. (Cl. 250—27)

(Granted under Title 35, U. S. Code (1952), sec. 266)

The invention described herein may be manufactured and used by or for the Government for governmental purposes, without the payment of any royalty thereon.

This invention relates to sampling circuits and more particularly to an apparatus for sequentially sampling several discrete reference voltages at a common output terminal.

It is very often necessary to apply to a certain central central point in an electronic circuit, any one of a number of reference voltages in sequence. Normally, this has been done in the past by means of electrical or mechanical relays and switching mechanisms. Such known devices have proven to be inadequate where sampling at a rapid rate with an accurate time sequence is desired.

The primary object of the present invention is to sequentially sample a plurality of discrete reference voltages rapidly at a common point.

A more specific object is to sequentially sample a plurality of different reference voltages rapidly with a desired time sequence, utilizing electronic means.

The invention resides in improved means for sampling a number of discrete reference voltages at a common point rapidly and in accurate time sequence under control of non-critical voltage pulses. In one embodiment, this apparatus includes a source of direct current voltage, a resistance connecting the common sampling point to the positive terminal of that source, and a plurality of circuits each including the common sampling point, a different one of the reference voltage sources, a pair of diodes connected in series between the source of reference voltage and the common sampling point, a resistance voltage divider and a grid-controlled vacuum tube connected in series between the positive and negative terminals of the direct-current voltage source, the voltage divider being connected at an intermediate voltage point to a junction point between the two diodes and switching means operating to bias the vacuum tube to the conducting condition at predetermined intervals. The polings of the diodes and the vacuum tube, the value of the direct-current voltage and the relative values of the various resistances in each circuit are selected such that when the vacuum tube is biased to the conducting condition the diodes are rendered conductive to bring the common sampling point to the potential of the reference voltage source in the circuit. The switching means of the several circuits are interconnected in such manner that the reference voltages are applied from the various circuits to the common sampling ploint in a desired time sequence.

For a better understanding of the invention, together with other and further objects thereof, reference is had to the following description taken in connection with the accompanying drawing and its scope will be pointed out in the appended claims.

Referring now to the drawing, there is schematically depicted a preferred embodiment of the present invention. As the invention is concerned with sequential sampling of a number of discrete reference voltages, an apparatus for sampling two such reference voltages is shown, although it is to be understood that any number of reference voltages can be sampled and the drawing is confined to only two for purposes of simplicity. Since there is an identical circuit for each reference voltage to be sampled, a circuit including a reference voltage not being sampled at any given instant is indicated within the dashed line box to show its relationship to the circuit which includes the reference voltage being sampled. Each of the individual sampling circuits is essentially the same, so that corresponding components in each circuit are indicated by the same numbers, the numbers of one circuit being distinguished from the others only by prime notation. For convenience, the apparatus in only one individual sampling circuit is described.

The reference voltage in the described individual sampling circuit is indicated in the drawing as being derived from point 1 on potentiometer 2 which is connected across potential source 5, by means of a slider contact 4. Each reference voltage to be sampled would be, more likely, an output voltage variation of a different part of associated circuitry, for example, a voltage representing a function such as a coordinate of a given point of interest in a display. The source of reference voltage at point 1 of potentiometer 2 is connected to a common output terminal 6 through slider contact 4 and diodes 8 and 10 which may be either thermionic or crystal diodes, it only being necessary that the resistance in the conductive direction of the diode be very low and the resistance in the opposite direction be very high. The anode 12 of diode 8 is connected to reference voltage source at 1 and the anode 14 of diode 10 is connected to terminal 6. The cathode 16 of diode 8 and the cathode 18 of diode 10 have a common connection at junction point 20. Also connected to junction point 20 is a voltage dividing network, which includes a first resistor 22 having one end connected to point 20 and its other end connected to the positive terminal 7 of direct-current potential source 5, the positive terminal 7 having a potential higher than the most positive potential expected at terminal 6. A second resistor 26 of the voltage dividing network has one end connected to junction point 20 and its other end connected to the anode 28 of a control tube 30 the cathode 36 of which is connected to the negative terminal 9 of the direct-current potential source 5. Control tube 30 may be a triode, tetrode, pentode, or any other grid-controlled vacuum tube which has a low direct current resistance in its conducting condition and a high direct current resistance in its cutoff condition. By means of a switch 32, tube 30 may be selectively biased beyond cutoff by negative direct current potential source 35 connected through a biasing resistor 33 to the grid 34 or biased to the conducting condition. When switch 32 is open, tube 30 is nonconductive and when switch 32 is closed, tube 30 is rendered conductive. Of course, in place of switch 32, associated resistor 33 and negative potential source 35, tube 30 may be selectively rendered conductive or non-conductive by electronic switch means (not shown), such as a circuit which will maintain tube 30 in its non-conducting condition except when a positive pulse is applied to grid 34. With switch 32 in the closed position as shown, the negative biasing potential 35 is disconnected effectively from grid 34 and that grid is connected directly to the cathode 36 of the same tube. The cathode 36 of tube 30 is connected to the negative terminal 9 of potential source 5. The values of resistors 22 and 26 are each preferably several times as large as the resistance in the circuit of the reference voltage source at point 1. The relation of the values of resistors 22 and 26 is such that when the control tube 30 is in its conducting state, the junction 20 of resistors 22 and 26, in the absence of diodes 8 and 10, is at a somewhat more negative potential than the lowest potential expected from a reference voltage at point 1 or at terminal 6. A resistor 38 is connected between terminal 6 and the positive terminal of potential source 5, the value of which is preferably several times as high as the series combination of resistors 22 and 26.

Considering the operation of the above described apparatus, each circuit would be repeated once for each separate reference voltage to be applied to terminal 6. Resistor 38 is common to all the circuits. The operation of a single circuit is as follows. If control tube 30 is considered to be in its cutoff condition, that is with switch 32 open, there will be no current flowing in resistors 22 and 26, and all points in the circuit, including cathodes 16 and 18 of diodes 8 and 10, respectively, junction point 20, and terminal 6, will be at the potential of the positive terminal of source 5. Anode 12 of diode 8 will be at the potential of reference voltage source at 1 and consequently at a lower potential than terminal 7. Consequently, anode 12 will be at a lower potential than cathode 16 and diode 8 will not conduct. However, when control tube 30 is rendered conductive by connecting switch 32 to grid 34, junction point 20 and cathodes 16 and 18 will approach their lowest potential from the positive direction. Since this causes cathode 16 of diode 8 to fall below the potential of anode 12 as determined by reference voltage at 1, conduction occurs through diode 8, thus bringing junction point 20 to the potential of the reference voltage at 1. Now since common output terminal 6 and anode 14 of tube 10 are connected to terminal 5 through a high resistance 38, cathode 18, also being at the potential of junction point 20, will tend to become more negative than terminal 6. However, this tendency will be counteracted by the flow of current through the low resistance of diode 10, and thus terminal 6 will be brought to the potential of junction point 20 and of the reference voltage at 1. When diodes 8 and 10 are of the thermionic type, current will be conducted not only when the anode is positive with respect to the cathode, but also when the anode is slightly negative, because of the initial velocities of the thermionic electrons from the cathode. Thus, the cathodes of the diodes can be expected to be slightly positive with respect to their anodes. However, if the diodes are electrically similar, this potential difference can be expected to be substantially the same in the two diodes, and therefore, the potential of anode 14 of diode 10 agrees very closely with the potential of anode 12 of diode 8. The presence of other similar circuits connected in parallel through their respective diodes to terminal 6 does not affect the operation of the circuit containing the reference voltage source being sampled while their control tubes are cutoff, since the cathodes of the diodes of the other circuits will remain at the most positive potential. In order to apply any one of the other reference voltages to terminal 6, it is only necessary to place tube 30 in its cutoff state and to render conductive a corresponding control tube 30' in a circuit containing the next reference voltage source to be sampled. For the circuit shown at the right in the drawing this can be done by connecting the grid 34' to the negative terminal 9 of potential source 5 by throwing switch 32 to its right hand contact. Thus a series of voltages may be sampled at terminal 6.

While there have been described what are believed to be the preferred embodiments of the present invention, it will be understood by those skilled in the art that various changes and modifications may be made therein without departing from the invention, and it is, therefore, aimed in the hereinafter appended claims to cover all such modifications and changes as fall within the spirit and scope of the invention.

What is claimed is:

1. An apparatus for sequentially sampling a plurality of discrete reference voltages from separate sources at a common sampling point, comprising a source of direct-current potential having a positive and a negative terminal, a resistance connected between said positive terminal and said common sampling point and a plurality of branch circuits each comprising said common sampling point, a different one of the reference voltage sources, a pair of diodes connected in series between the reference voltage source and said common sampling point with their cathodes connected to each other and their anodes respectively connected to the reference voltage source and to said common sampling point, a voltage divider and a space discharge tube having a grid, a cathode and an anode, connected in series with each other between the positive and negative terminals of said direct-current potential source with one end of the voltage divider connected directly to said positive terminal, the cathode of said tube connected directly to said negative terminal and the anode thereof connected directly to the other end of the voltage divider, said voltage divider being connected at an intermediate voltage point directly to a junction point between the cathodes of said diodes, and switching means for applying at predetermined time intervals a bias to the grid of said tube to render said tube conductive, the circuit constants in each of said branch circuits being respectively selected so that the potential produced at the junction point when said tube is conductive is such as to render said diodes conductive to bring said common sampling point to the potential of the reference voltage source in the circuit.

2. The apparatus of claim 1, in which the switching means of said plurality of circuits are so interconnected that they may be operated in any desired time sequence to bias the associated discharge tubes to the conducting condition and thus to cause the respective discrete reference voltages to be applied in turn to said common sampling point with a desired rapidity and time accuracy.

3. The apparatus of claim 1, in which said voltage divider in each said circuit comprises two resistances connected between said junction point and said positive terminal and the anode of said tube, respectively, each of which is of appreciably greater value than the resistance in the circuit of the reference voltage source, and which two resistances are of such relative values that, in the absence of said diodes, when said discharge tube is in its conducting state, said junction point would be at a more negative potential than the lowest potential expected from the reference voltage source or at said common sampling point, said positive terminal of said source of direct-current potential is at a higher potential than the most positive potential expected at said common sampling point, and the magnitude of the resistance connected between said sampling point and the positive terminal of said source of direct-current potential is substantially higher than the combined value of said two resistances.

References Cited in the file of this patent

UNITED STATES PATENTS

| | | |
|---|---|---|
| 2,576,026 | Meacham | Nov. 20, 1951 |
| 2,616,960 | Dell et al. | Nov. 4, 1952 |
| 2,618,753 | Van Mierlo | Nov. 18, 1952 |
| 2,782,303 | Goldberg | Feb. 19, 1957 |
| 2,782,307 | Sivers et al. | Feb. 19, 1957 |

FOREIGN PATENTS

| | | |
|---|---|---|
| 141,257 | Australia | June 17, 1948 |